US012610011B2

(12) United States Patent　(10) Patent No.:　US 12,610,011 B2

Tsiatsikas et al.　(45) Date of Patent:　Apr. 21, 2026

---

(54) METHOD AND SYSTEM FOR EFFICIENT CALLBACK FUNCTIONALITY USING SIGNAL COVERAGE DATA

(71) Applicant: ATOS Public Safety, LLC, Irving, TX (US)

(72) Inventors: Zisis Tsiatsikas, Salonika (GR); Athanasios Pagonis, Vrilissia (GR); Sofia Anagnostou, Nea Erythrea (GR)

(73) Assignee: ATOS PUBLIC SAFETY LLC, Irving, TX (US)

( * ) Notice: Subject to any disclaimer, the term of this patent is extended or adjusted under 35 U.S.C. 154(b) by 371 days.

(21) Appl. No.: 18/346,902

(22) Filed: Jul. 5, 2023

(65) Prior Publication Data

US 2024/0179242 A1　May 30, 2024

(30) Foreign Application Priority Data

Nov. 29, 2022　(EP) ..................................... 22210323

(51) Int. Cl.
| | |
|---|---|
| *H04M 3/523* | (2006.01) |
| *H04M 3/51* | (2006.01) |
| *H04W 64/00* | (2009.01) |

(52) U.S. Cl.
CPC ....... *H04M 3/5231* (2013.01); *H04M 3/5116* (2013.01); *H04W 64/00* (2013.01)

(58) Field of Classification Search
CPC ... H04M 3/5231; H04M 3/5116; H04W 64/00
USPC ....................................................... 455/404.2
See application file for complete search history.

(56) References Cited

U.S. PATENT DOCUMENTS

| | | | |
|---|---|---|---|
| 10,306,059 B1 * | 5/2019 | Bondareva ............ | H04L 51/214 |
| 10,715,662 B2 * | 7/2020 | Bondareva .......... | H04M 3/5166 |
| 11,093,814 B2 * | 8/2021 | Oyenan ................ | H04M 3/5116 |
| 2019/0325288 A1 | 10/2019 | Oyenan et al. | |

FOREIGN PATENT DOCUMENTS

EP　4007323 A1　6/2022

OTHER PUBLICATIONS

Extended European Search Report for European Application No. 22210323.6 dated Apr. 28, 2023.

* cited by examiner

*Primary Examiner* — Michael R Neff
(74) *Attorney, Agent, or Firm* — Meagher, Emanuel, Laks, Goldberg & Liao, LLP

(57)　ABSTRACT

A method and a system for efficient callback functionality can utilize signal coverage data. For example, a computer-implemented method can be configured to allow an emergency call taker to perform successful callbacks in case of abandoned emergency calls due to signal coverage and/or antenna overload issues in a location.

17 Claims, 5 Drawing Sheets

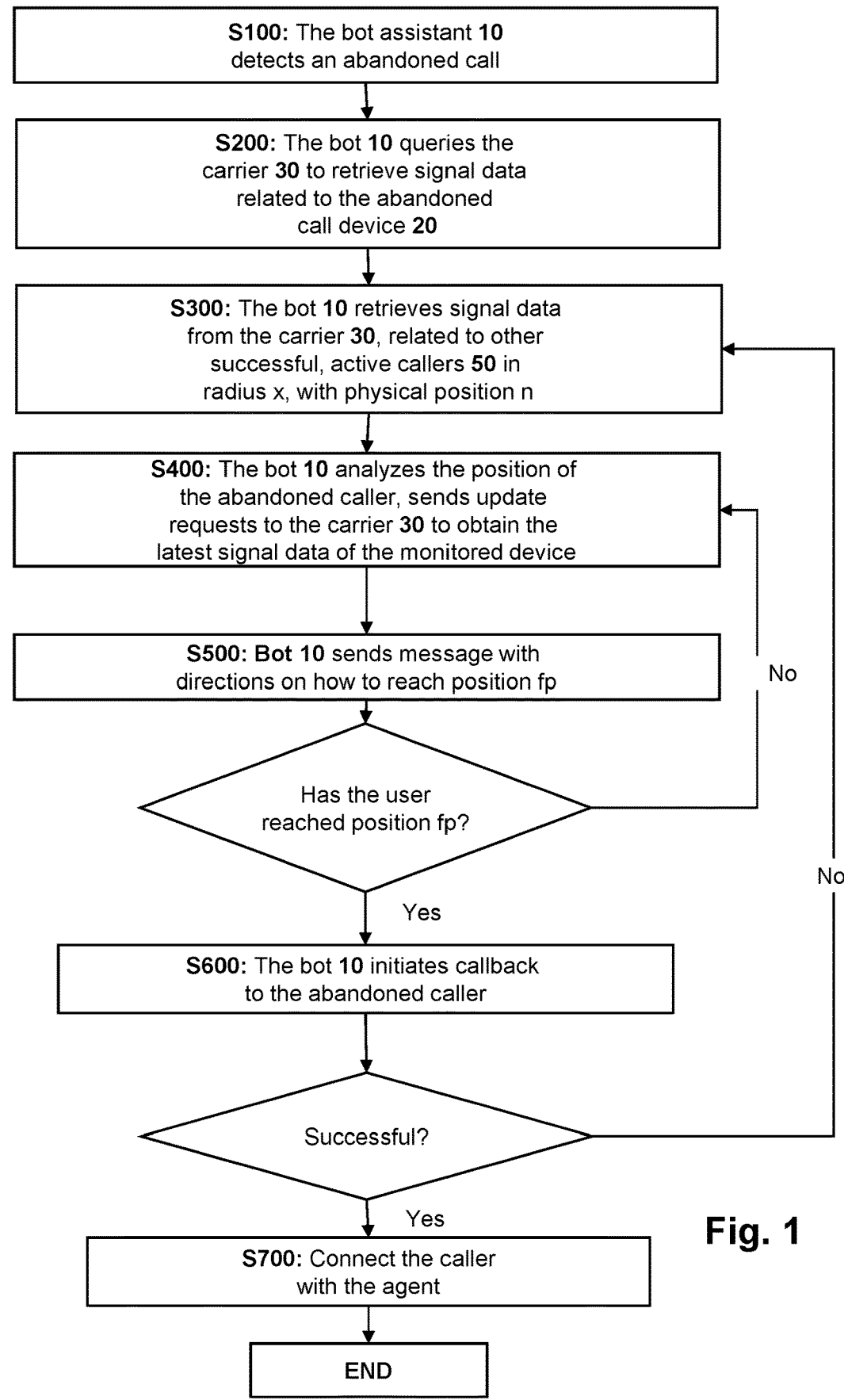

S100: The bot assistant 10 detects an abandoned call

S200: The bot 10 queries the carrier 30 to retrieve signal data related to the abandoned call device 20

S300: The bot 10 retrieves signal data from the carrier 30, related to other successful, active callers 50 in radius x, with physical position n

S400: The bot 10 analyzes the position of the abandoned caller, sends update requests to the carrier 30 to obtain the latest signal data of the monitored device

S500: Bot 10 sends message with directions on how to reach position fp

Has the user reached position fp?

No

S600: The bot 10 initiates callback to the abandoned caller

Yes

Successful?

No

S700: Connect the caller with the agent

Yes

END

Fig. 1

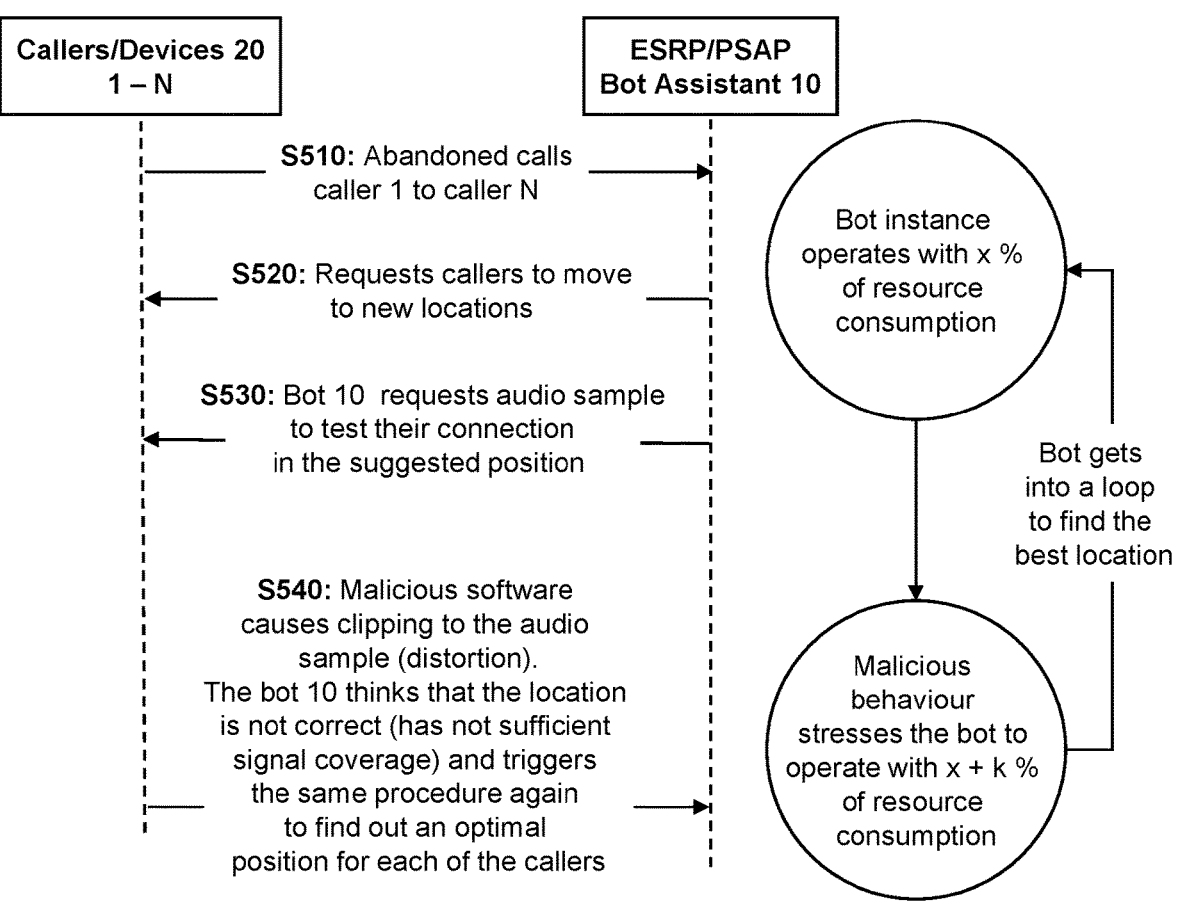

Callers/Devices 20
1 – N

ESRP/PSAP
Bot Assistant 10

S510: Abandoned calls
caller 1 to caller N

S520: Requests callers to move
to new locations

S530: Bot 10 requests audio sample
to test their connection
in the suggested position

S540: Malicious software
causes clipping to the audio
sample (distortion).
The bot 10 thinks that the location
is not correct (has not sufficient
signal coverage) and triggers
the same procedure again
to find out an optimal
position for each of the callers Bot instance
operates with x %
of resource
consumption Bot gets
into a loop
to find the
best location Malicious
behaviour
stresses the bot to
operate with x + k %
of resource
consumption

Fig. 5

S810: Check if there are other
devices in the abandoned call list
or in the active call list which
currently communicates/have
communicated successfully from
this position

?

Yes

No

S820: Find other devices in a
close location, irrelevant to the
incident, if any, and instruct
them to go in this position

S830: Test input from the
helper device in parallel to
the abandoned caller device.
Is it distorted from both sides?

END

No

Difference
in the
streams?

Yes

S840: Blacklist
malfunctioned devices

Fig. 6

METHOD AND SYSTEM FOR EFFICIENT CALLBACK FUNCTIONALITY USING SIGNAL COVERAGE DATA

CROSS-REFERENCE TO RELATED APPLICATIONS

The present application claims priority to European Patent Application No. EP 22 210 323.6, which was filed on Nov. 29, 2022. The entirety of this patent application is incorporated by reference herein.

FIELD

The present invention relates to a method and a system for efficient callback functionality using signal coverage data. Some embodiments can be configured to provide a computer-implemented method that allows an emergency call taker to perform successful callbacks in case of abandoned emergency calls due to signal coverage and/or antenna overload issues in a location, for example.

BACKGROUND

During an emergency call, there may be different hurdles that could prevent a caller to establish an emergency call. Such cases could be related to signal coverage issues or antenna overload issues. What mostly happens in such cases is that the call appears to be abandoned in the emergency calling center also called Public Safety Answering Point (PSAP). A PSAP is a physical or virtual entity where emergency calls are delivered by the Emergency Service Provider. In these cases, the specification guidelines according to the US National Emergency Number Association (NENA) and the European Emergency Number Association (EENA) is that the agents of a PSAP should follow specific protocols in order to handle the issue and a frequent protocol is used for a callback to take place from the emergency center to the caller. NENA is fully dedicated to the continued improvement and modernization of the US emergency communication system. EENA is a non-governmental organization dedicated to promoting high-quality emergency services throughout the European Union.

SUMMARY

We determined that there is a problem in situations where a large-scale emergency incident may occur using conventional methods for addressing calls. For example, conventional processing often requires agents to waste useful time to place callbacks to callers which may face signal issues. The callers, referred to here as users may try to find a better position to initiate an emergency call, at the same time many different users will try to access the service and at the end this equals to multiple abandoned emergency calls.

On top of that, usually in rural areas (e.g. mountains, forests, etc.), the telecommunications infrastructure (e.g., antennas) does not offer the capacity for all users during peak periods (e.g. during vacation periods, national holidays, etc.). So, it is not always the case that the infrastructure cannot cover the incident because the incident is a large scale one (e.g., too many people gathered in a place), but it may happen that the infrastructure in a place has limitations because it was set up for a smaller population than the actual one during peaks.

In such cases, for example, during a fire the infrastructure is usually overloaded very easily and at the same time signal coverage issues may occur.

During such situations it is very difficult for the agents to place successful callbacks, especially if the users do not have signal coverage. It is also not easy to know when there is an available slot to place the callback, in order to establish a call and bypass the antenna overload obstacle.

We determined that the solutions in the state of the art do not reflect the aforementioned problem. The prior art presents different ways to build a strength map with geographical locations that offer complete signal coverage. Some mobile applications offer a list of known map positions that offer signal coverage/signal strength. This is mostly done only by analyzing the signal data without any other channel of information. Moreover, such applications do not solve the overload issues. Therefore, we have developed embodiments of a method and a corresponding system for efficient callback functionality using signal coverage data that can be configured to guide users on a geographic position that will have signal coverage. Some embodiments can be configured to monitor antennas/wireless networks in case of an overload so that a slot can be reserved in order to place a callback for an incomplete emergency call.

A method for efficient callback functionality using signal coverage data can include detecting, by a bot, an abandoned call of a device which has tried to establish an emergency call or for which an emergency call was not yet completed.

A bot can be a program, an application or a service which can be implemented in the ESRP, the PSAP, or the client device. The ESRP, PSAP, or client device can be a type of communication device that can include a processor connected to a non-transitory memory and at least one transceiver. Such a device can also include at least one input device communicatively connectable to the processor and at least one output device communicatively connectable to the processor. Examples of input devices can include a keyboard, a pointer device, a mouse, a microphone, a stylus, or a touch screen display. Examples of an output device can include a speaker, a display, a printer, or other type of output device. The bot can be defined by code stored in the memory of the device and be implemented by the processor running the code to perform the bot defined functionality. The bot can be defined so that the device running the bot is configured to automatically guide the user to a region with good signal coverage, and to retrieve data related to signal coverage geolocations. Such guiding can be provided via one or more communications the device may provide to a device of a user, for example.

The term not yet completed as used herein can refer to a call that was interrupted although there was still a need to find out more details about an incident. Such a call can be an incomplete call or a call that was disconnected before the call was desired to be ended by users participating in the call due to a technical problem (e.g. loss of connectivity, loss of bandwidth that supported the call, etc.).

The term abandoned call device can include the abandoned call and also the caller's device for the caller who is the user of this device. Embodiments of the method can include querying, by the bot, a network carrier to retrieve signal data related to an abandoned call device.

A network carrier can be a network service provider or a gateway which communicates with a network carrier.

The term signal data can refer to location data of the device of interest which has been computed on the carrier side using triangulation or other type of location detection mechanism or location detection scheme.

Embodiments of the method can also include retrieving, by the bot, signal data from the carrier related to one or more other successful active device in a radius x, at last k minutes with respect to the position p of the abandoned call device. A successful active device can refer to a device that does not suffer from signal coverage issues. The signal data can be utilized to reveal a physical position of the one or more other devices.

In some embodiments, the radius x can be 1 to 100 meters/km, whereby 1 to 50 are preferred. The parameter k can be 1 to 10 minutes, whereby 1 to 5 minutes are preferred.

Embodiments of the method can also include analyzing, by the bot, the position p of the abandoned call device and sending an update request to the carrier to retrieve the latest position p of the abandoned call device. This can be done by only using the signal data.

Embodiments of the method can include sending, by the bot, a first message to the abandoned call device, based on the signal data retrieved for the one or more successful active device in the radius x, to guide the abandoned call device to a first position fp retrieved from the one or more successful active device. The directions to reach any position can be given in writing in a simple form. For example, go straight ahead for 50 steps, etc.

Then initiating, by the bot, a callback to the abandoned call device when it reaches the first position fp retrieved from the one or more successful active device.

Finally, connecting, by the bot, the abandoned call device with a call taker of a call center, in the case the callback from a previous step is successful.

The bot can be configured so the device running the bot can guide a user of an abandoned call device to move on to a better location in terms of signal coverage only by using messages. This can help avoid a need to establish a data channel with the abandoned call device and can help prevent a high load in an antenna.

According to a preferred embodiment, the method can include repeating, by the bot, the step of analyzing the position p of the abandoned call device as many times as necessary so that the abandoned call device will reach the requested first position fp. Using this step, the bot can monitor the position of the abandoned call device using only the signal data retrieved from the carrier.

According to another preferred embodiment, the method comprises repeating, by the bot, the steps of retrieving, analyzing, sending, and initiating, in the case the callback is not successful, wherein sending, by the bot, a further message with a further position np to the abandoned call device, in case the abandoned call device does not reach the requested first position fp.

According to still another preferred embodiment, the method can include storing, by the bot, in a database the position information of the first position fp and/or any further position np of the one or more successful active device as an indirect source of information of possibly dangerous positions with respect to the current emergency incident, if the abandoned call device does not reach the first position fp and/or any further position np. If the instructed caller does not reach the suggested position which offers better signal coverage, this indirectly entails that this position is probably dangerous. The database can be stored locally in memory of the device running the bot or can be stored in memory that is accessible to the device running the bot (e.g. memory of a database server that may host the database or be communicatively accessible to the device running the bot, etc.).

Further, according to a preferred embodiment, the bot can retrieve the information and data of the abandoned call device from an Emergency Service Routing Proxy (ESRP) and/or wherein the call center is a Public Safety Answering Point (PSAP).

According to yet another preferred embodiment, the method can include building, by the bot, a list of positions with successful signal coverage using the dataset from the retrieving step and analyzing, by the bot, the data from the querying and retrieving step to guide the device to the position of the list which is closest to the abandoned call device.

According to yet another preferred embodiment, the method can include continuing, by the bot, to query the carrier for new signal data related to the abandoned call device for k seconds. Wherein a suitable range for k can be between 1 to 120 seconds with range of 10 10 to 60 seconds being preferred in some embodiments.

According to yet another preferred embodiment, the method can include sending, by the bot, a message to the abandoned call device to stay and to wait at a reached first position fp and/or any further position np.

According to yet another preferred embodiment, before initiating a callback, the bot can check to determine whether an antenna overload issue exists, and if no such overload condition exists, the bot can proceed further with initiating the callback. The check can be configured so that the bot queries or pings the carrier for any antenna overload issue before initiating the callback.

According to yet another preferred embodiment, the method can include monitoring, by the bot, the network capabilities of the cellular and/or wireless infrastructure to detect any antenna overload issues. It is in this context also possible that the bot queries or pings the carrier to check if there is any antenna overload issue.

The network capabilities of the cellular and/or wireless infrastructure to detect any antenna overload issues can refer to a surge of requests that may flood the carrier and/or the antennas.

According to yet another preferred embodiment, the cellular/wireless infrastructure can include a three-sector networking infrastructure and/or a multi-sector networking infrastructure. A three-sector networking infrastructure can refer to an antenna with three sectors, for example.

A multi-sector networking infrastructure can refer to an antenna with multiple sectors with the aim to cover all directions.

According to yet another preferred embodiment that may be employed in the three-sector networking infrastructure, the bot can wait until a free slot is available, wherein the other sector with free slots be located more than 1 km for the abandoned device position and the average time needed for a 1 km walking distance is more than the medium time for slots available during the day and/or wherein in the multi-sector networking infrastructure, sending, by the bot, a message to the abandoned device to move to another sector, wherein the average time needed for a 100 meters walking distance is significantly less than the medium time for slots available during the day. An average time needed for a 1 km, or 100 meters walking distance can be defined to be the time it takes an average adult to cover these distances. Such a time can be based on a pre-selected walking speed for an average adult to cover that distance, for example.

According to yet another preferred embodiment, the message sent by the bot can include one of a Short Messages Service (SMS) message. The latter is preferred because there are not increased requirements in terms of bandwidth in case a user experiences limited signal coverage issues. Other possible ways of communication include the use of a socket communication over any type of protocol, assuming that the client device supports the protocol and/or has installed a relevant application. We have found that the use of a silent SMS message can be found useful in case the emergency service wants to monitor and take the latest information regarding the geolocation of the user.

According to yet another preferred embodiment, in the step of initiating the callback, the method can include using, by the bot, for initiating the callback request an internal for-loop for anticipating the overload issue depending on the cellular/wireless network infrastructure and/or the statistical measurements for slots available during the day. The for-loop can be designed in a way that the bot calls a user only if the latter has reached the requested region or at least has completed more than x % of the requested route to reach the region. Wherein, x can vary between 90% to 100%, but it is preferred to be more than 95% in some embodiments.

Moreover, if more than one user moves in the same direction, the bot can be configured to proactively select to group and direct those users in different close locations, so that they can have both line of sight communication path and also avoid the case of an accident for all of those users.

According to yet another preferred embodiment, in situations where the callback to the abandoned call of a device is not successful, the method can also include querying, by the bot, if there are other devices in an abandoned call list or in an active call list of an ESRP or a PSAP which currently communicate and/or have communicated successfully from the at least first position fp; extending, by the bot, if no other devices are found, the query to other devices in a close location to the at least first position fp and instructing, by the bot, the other devices to go to the at least first position fp, if devices in a close location to the at least first position fp are found; testing, by the bot, input streams from the other devices in parallel to the abandoned call of a device upon a difference in stream quality then all devices are in the at least first position fp; and blacklisting, by the bot, malfunctioned device(s) if there is a difference in stream quality, otherwise ending the method. Input streams can be any kind of audio, video or data streams that enable communication.

A system for efficient callback functionality using signal coverage data is also provided. Embodiments of the system can be configured to perform embodiments of the method or steps of the method.

Embodiments can be configured to handle two major tasks. The first one concerns the guidance of the user of an abandoned call device on to a geographic position that will have signal coverage. The second one relates to the monitoring of the antenna in case of an overload so that the bot will reserve a slot in order to place the callback. We believe that both of these tasks can be really frustrating and difficult for a call taker in a call center to perform, especially an actual human agent in a PSAP. So, with the present invention a solution is offered to enhance and optimize these problems so that a communication device can automatically provide such functionality without agents having to be involved to spend their time and effort on such tasks.

It should also be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular combinations between features relating to the apparatus type claims and features relating to the method type claims are considered to be disclosed. The invention and embodiments thereof will be described below in further detail in connection with the drawing(s).

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawing(s).

FIG. 1 is a block diagram illustrating method steps according to an exemplary embodiment of the invention.

FIG. 5 is a flowchart illustrating a scenario where devices are acting maliciously.

FIG. 6 is a block diagram illustrating steps of an exemplary embodiment of a method for a scenario where the devices are acting maliciously according to another embodiment of the invention.

Figure 2:
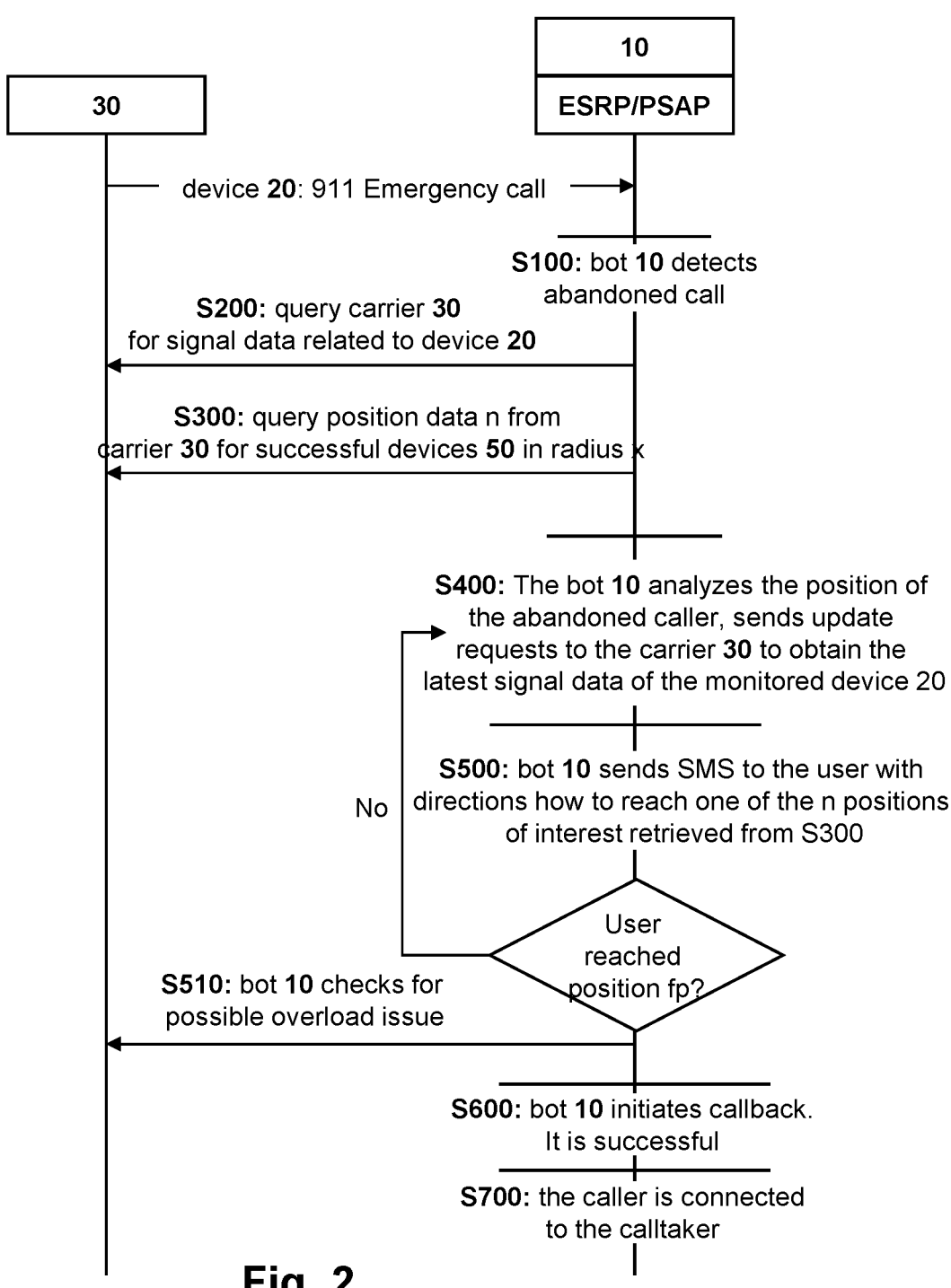
FIG. 2 is a flowchart illustrating method steps according to another embodiment of the invention.

Reference numerals used in the drawings include:

10 assistant bot
20 abandoned caller/device
30 carrier
50 other devices
S100-S840 steps of the method
PSAP Public Safety Answering Point
ESRP Emergency Service Routing Proxy
p position of the abandoned caller/device (20)
fp at least first position
n physical positions of the one or more other devices (50)
np further position

DETAILED DESCRIPTION

In FIG. 1 steps of an exemplary embodiment of a method for efficient callback functionality using signal coverage data are shown. The method according to this embodiment can be triggered by a bot assistant 10 that is defined in code stored in memory of a device that can be run by a processor connected to the memory. The device running the bot can detect an abandoned call of a device 20 which has tried to establish an emergency call or for which an emergency call was not yet considered completed (see e.g. step S100 of FIG. 1).

In the next step S200, the bot assistant 10 can perform a query to the network carrier 30 to retrieve signal data related to the abandoned call device 20.

In step S300, the bot 10 can retrieve signal data from the carrier 30 related to other successful active device(s) 50 in radius x, the last k minutes, with respect to the abandoned call device 20. The signal data also reveals their physical position n. This step offers data regarding other near positions that do not suffer from signal coverage issues. So, if the abandoned call device 20 can be guided to these near positions, then the abandoned call device 20 can be reached easily with a callback.

In Step S400, the bot 10 analyzes the position of the abandoned call device 20 and sends an update request to the carrier 30 to retrieve the latest position of the abandoned call device 20. This is done by only using the signal data.

Based on the data retrieved for the successful active device(s) 50 in radius x, the bot 10 sends in step S500 an SMS to the abandoned call device 20 to guide it to one of the positions retrieved from Step S300. Even if the signal coverage is not sufficient, it is assumed that the abandoned call device 20 can receive simple SMS messages. The directions will be given in writing in the SMS in a simple form. For example, go straight ahead for 50 steps, etc.

Steps S400 and S500 can be repeated as many times as necessary so that the abandoned call device 20 will reach the requested position fp. Using step S400, the bot monitors the position p of the user using only the signal data retrieved from the carrier 30.

When the device 20 reaches the position, the bot 10 initiates a callback to the device 20 according to step S600 in FIG. 1.

If the callback is successful, in step S700 the bot 10 then connects the device 20 with a call taker of the responsible emergency call center. If the callback is not successful, the method repeats at step S300.

It should be appreciated that the actions of the bot 10 can be actions of the device running the code that defines the functionality of the bot 10. The device running that code can be a communication device that has a processor connected to the non-transitory memory that stores the code defining the bot, for example. That device can also include at least one transceiver connected to the processor for communications the device can have with other devices. The device can also have or be connectable to one or more input devices (e.g. touch screen display, microphone, pointer device, keyboard, keypad, etc.) and/or one or more output devices (e.g. speaker, display, etc.).

The abandoned call device 20 can be a type of communication device as well. For example, the abandoned call device can be a cellular phone, smart phone, laptop computer device, tablet, or other type of communication device. The abandoned call device 20 can have a processor connected to the non-transitory memory and at least one transceiver unit and can also include one or more input devices (e.g. touch screen display, microphone, pointer device, keyboard, keypad, etc.) and/or one or more output devices (e.g. speaker, display, etc.) connectable to the processor.

The embodiment of FIG. 1 can exemplifies an embodiment of our method in a way that the abandoned call device 20 needs to reach a position that is suggested by the bot 10. According to another embodiment shown in FIG. 2, it is assumed that the device 20 cannot reach the first position fp and thus the method is executed x more times, so that the device 20 sets foot to one of the proposed positions which is easier for a user to take his or her device to or is a location that is not dangerous. That is, this can also be used as an indirect source of information for the bot 10 to identify possibly dangerous positions with respect to the current emergency incident. After the bot 10 identifies an abandoned call, in step S100, it queries the carrier 30 for signal data related to the abandoned call device 20 (see step S200 in FIG. 2).

After that, one more queries can be performed to the carrier 30 to retrieve data related to other devices 50 in the area which successfully managed to establish a call. In this, step S300 a search is done with regards to a radius x compared to the abandoned call device 20. Using the dataset from step S200, the bot 10 builds a list of positions with successful signal coverage.

In Step S400 the bot 10 analyzes the data from the steps S200 and S300 to guide the device 20 to the geographic position of the list which is closest to the device 20. The bot 10 further queries the carrier 30 in a timely manner for signal data related to the abandoned caller/device 20.

The bot 10 sends in step S500 the directions of the suggested position using an SMS communication (e.g. text messaging). Since the position data of the abandoned call device 20 gets analyzed in a timely manner, the bot 10 can identify if the device 20 has reached the position fp.

The bot 10 continues to query the carrier 30 for new signal data related to the abandoned call device 20 for k seconds. The device 20 does not reach the requested position, so the bot 10 sends a new SMS with directions for the second suggested geographic position. The bot 10 queries the carrier 30 to identify if the device 20 is moving towards the suggested geographic position. The bot 10 analyzes the signal data and verifies that the device 20 has reached the requested position. The bot 10 sends SMS to the device 20 to wait in this position. In Step S510 the bot 10 queries the carrier 30 to check if there is any antenna overload issue. Such a problem does not exist and in the next step S600 the bot 10 initiates a callback to the abandoned call device 20. The callback is successful and in the last step S700 the bot 10 connects the abandoned call device 20 to a Public Safety Answering Point (PSAP) agent.

Figure 3:
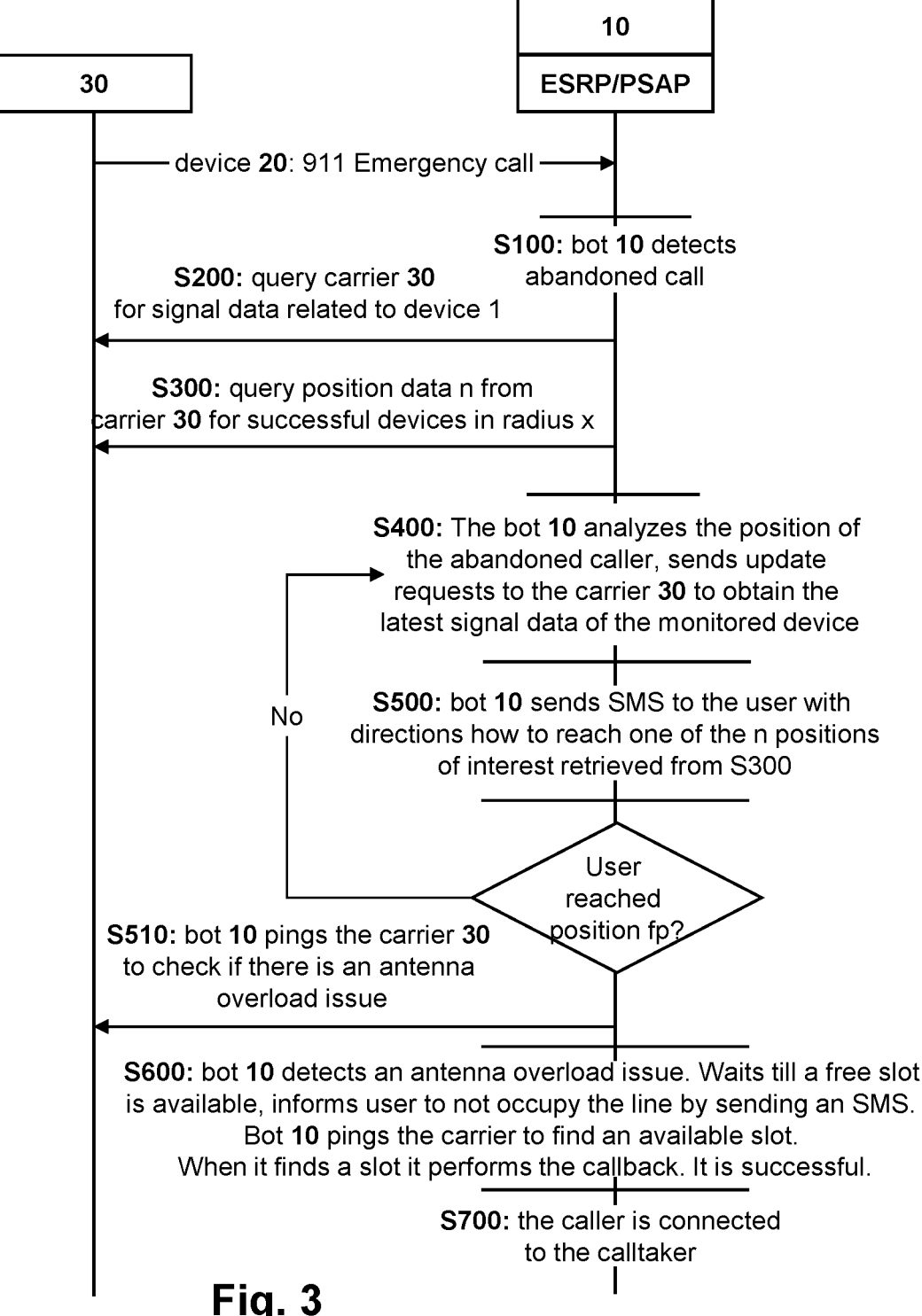
FIG. 3 is a flowchart illustrating method steps according to another embodiment of the invention.

The embodiment shown in FIG. 3 is another possible variation of the embodiment of FIG. 2. The variation in the embodiment according to FIG. 3 applies to the section of the overload issue, step S510 as mentioned in the previous embodiments. In this case, there is an antenna overload issue. Since there is an overload issue, the callback will not be successful due to unviability of resources for establishing the call request. Depending on the cellular/wireless infrastructure there are many options for diminishing the waiting time for offering the callback request.

The bot 10 is aware of the network capabilities of the cellular/wireless infrastructure, e.g. by monitoring three-sector or multi-sector networking. In a three-sector networking infrastructure, the bot 10 needs to wait till a free slot is available, as the other sector with free slots could be located more than 1 km for the caller/device 20 position—the time needed for 1 km walking distance is more than the medium time for slots available during the day, according to statistical measurements. On the other hand, in a multi-sector networking infrastructure, the bot 10 will assist the caller/device 20 to move to the other sector, just 100 meters far away—the time needed for 100 meters walking distance is significantly less than the medium time for slots available during the day, according to statistical measurements. In the latter case, the caller/device 20 will be notified by SMS to move to another sector instead of not occupying the line.

In a step S600 for initiating a callback request, an internal for-loop for anticipating the overload issue depending on the cellular/wireless network infrastructure and the statistical measurements for slots available during the day can be utilized so that once the overload issue is overcome, the bot 10 will initiate a callback to the abandoned call device 20. The callback is now successful and in the last step S700 the bot 10 connects the abandoned call device 20 to a PSAP agent.

Figure 4:
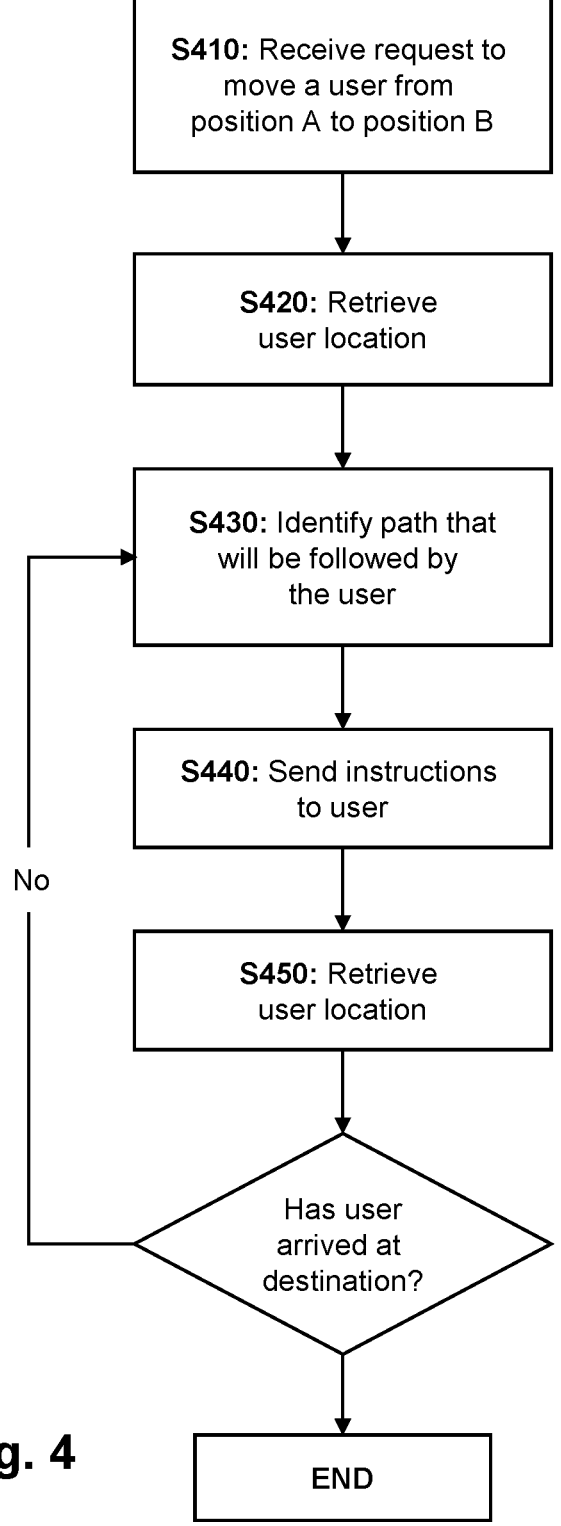
FIG. 4 is a block diagram illustrating steps of the method for moving a device 20 between two positions according to another embodiment of the invention.

In the embodiment depicted in FIG. 4, the moving of a device 20 between two positions is shown in a block chart diagram. In step S410, the bot 10 receives a request to move an abandoned call device 20 from position A (X1, Y1) to position B (X2, Y2). In step S420, the bot 10 retrieves the caller/device 20 location A (X1, Y1). This can be done either by sending a request to a Location identification Server (LiS), or by using silent SMS messages, or by sending a request to the carrier 30 using the ID of the device 20, to retrieve the device location based on the signal data of the device 20. In step S430, the bot 10 identifies on the map possible routes to move from A (X1, Y1) to B (X2, Y2). This can be done by using, for example, a maps technology like google maps or else. In this step, the bot can query other sources of information, like, for example, the PSAP database or social media, to identify possible threats in the routes and thus to select the one which is the safest. In step S440, the bot 10 sends instructions to the device 20 by splitting the route from step S430 in n parts. So, for example, the first part out of n parts for the selected route can be send to the device 20 as instructions to move 30 steps ahead. In step 440, the instructions can be sent to the device 20 using a simple SMS, or by initiating an audio or video stream, e.g. by receiving a short callback that will direct the caller/device 20 with a voice or video announcement. This depends on the load that the carrier 30 is experiencing. It may be the case that the antenna is not overloaded and the user experiences signal coverage issues. In this case, a short callback could be feasible. In case the antenna is overloaded, and the user is not sufficiently covered by the antennas, then the SMS is the best solution.

In any of these cases, the caller/device 20 does not require to have a special application installed on the device 20. In step S450, after m seconds the bot 10 retrieves the location of the device 20 to identify if the device 20 has reached the requested position (e.g., if the device 20 has covered the t out of n parts). This holds true in case the desired route is segmented in n discrete parts. For example, the device 20 may have covered t out of the n parts which corresponds to 95% of the requested target position. If this is true, then the service sends new instructions to the device 20 so that the latter can cover the n+1 part of the route and so forth. If the device 20 has not reached the requested position, or the caller/device 20 is moving in a wrong direction, the method executes again at step S430. After the device 20 has arrived at the destination (e.g., position B (X2, Y2), the method terminates.

In FIG. 5 a scenario is shown in a flowchart where devices 20 are acting maliciously according to another embodiment of the invention. In a first step S510 of this scenario, a call of one or more caller having a device 20 depicted as 1–N in FIG. 5 is considered as an abandoned call by a bot 10, e.g. of an ESRP or PSAP. In the next step S520, the one or more caller is requested by the bot 10 to move to a new location. Then in step S530, the bot 10 requests an audio sample from the one or more caller respectively device 20 to test the connection if the one or more caller has reached the suggested position. However, in this scenario in step 540, a malicious software of the device 20 causes a clipping or a distortion to the audio sample. The bot 10 thinks that the location is not correct (has not sufficient signal coverage) and triggers the same procedure again to find out an optimal position for each of the callers 1–N. Such a behavior gets the bot 10 into a loop which can lead to an enhanced resource consumption by the bot 10. Assuming that the bot instance 10 operates with x % of resource consumption, however, a malicious behavior stresses the bot 10 to operate with x+k % of resource consumption.

FIG. 6 shows steps of the method according to another embodiment of the invention in a block diagram. A design objective for this embodiment is to solve a scenario where devices 20 are acting maliciously as shown in FIG. 5. In step S810, the bot 10 checks if there are other devices in the abandoned call list or in the active call list of, e.g. an ESRP or a PSAP which currently communicates/has communicated successfully from the position the bot 10 has suggested first. In step S820, if no other devices are found, the bot 10 extends the query to other devices in a close location to that last suggested position and/or irrelevant of the incident. Further, if the bot 10 found devices in close location to that last suggested position, then the bot 10 instructs these devices or callers to go to the suggested first position. Then in step S830, the bot 10 tests input from the other device(s) in parallel to the abandoned caller device 20. If there is a difference in stream quality of the compared devices, then in step S840, the bot 10 blacklists the malfunctioned device(s), otherwise the method ends.

Embodiments can be configured so that the bot 10 can create groups of devices/callers which will be directed in specific locations with signal coverage. At the same time, if a first group is found to be directed in a location with a good signal coverage, better than the location of a second group, the bot 10 will direct the second group of devices/callers also in the location of the first group. Obviously the for-loop will be used to contact only the first group with an audio-video callback stream, thus avoiding to consume resources in the second group of devices/callers.

The grouping of devices/caller can be configured to avoid a case in which malicious software running on one or more of the devices being the central point for wrong information for all of these devices/callers. Thus, if the devices/callers are grouped in more than one group, receiving instructions to move to a location, it can be easily verified that the information received by the majority of the devices is correct.

Finally, by preserving the different groups of devices/callers in a close location between them, with a possible line of sight, communication can also benefit from the situation where few of those devices are acting maliciously. This is because if a group manages to communicate with the emergency service, then the other devices/callers can benefit, regardless of whether their device is infected or not.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, computer device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for efficient callback functionality using signal coverage data, wherein the method comprising:

detecting, by communication device running a bot, an abandoned call of a device which has tried to establish an emergency call or for which an emergency call was not yet completed;

querying, by the device running the bot, a network carrier to retrieve signal data related to the abandoned call device;

retrieving, by the device running the bot, within last k minutes, signal data from the network carrier related to one or more other successful active device, in a radius x, with respect to a position p of the abandoned call device, wherein a successful active device refers to an active device which successfully managed to establish a call and the signal data identifies physical positions n of the one or more other successful active device;

analyzing, by the device running the bot, the position p of the abandoned call device and sending an update request to the carrier to retrieve a latest position p of the abandoned call device;

sending, by the device running the bot, a first message to the abandoned call device, based on the signal data retrieved for the one or more other successful active device in the radius x, to guide the abandoned call device to at least a first position among the physical positions n of the one or more other successive active device;

initiating, by the device running the bot, a callback to the abandoned call device when the abandoned call device reaches the first position; and connecting, by the device running the bot, the abandoned call device with a call taker of a call center.

2. The method of claim 1, comprising:

repeating, by the device running the bot, the analyzing of the position p of the abandoned call device and sending an update request to the carrier to retrieve the latest position p of the abandoned call device as many times as necessary so that the abandoned call device will reach the first position.

3. The method of claim 1, comprising:

sending, by the device running the bot, a further message with a further position np to the abandoned call device, in case the abandoned call device does not reach the first position.

4. The method of claim 1, comprising:

storing, by the device running the bot in a database the position information of the first position and/or any further position as an indirect source of information of possibly dangerous positions with respect to a current emergency incident, in response to the abandoned call device not reaching the first position and/or any further position.

5. The method of claim 1, wherein the device running the bot retrieves the information and data of the abandoned call device from an Emergency Service Routing Proxy (ESRP) and/or wherein the call center is a Public Safety Answering Point (PSAP).

6. The method of claim 1, wherein building, by the device running the bot, a list of positions with successful signal coverage using a dataset from the querying and analyzing, by the device running the bot, data to guide the abandoned call device to a geographic position of the list which is closest to the abandoned call device.

7. The method of claim 1, comprising:

continuing, to query the carrier by the device running the bot for new signal data related to the abandoned call device for a predetermined number of seconds.

8. The method of claim 1, comprising:

sending, by the device running the bot, a message to the abandoned call device to stay and to wait at a reached first position and/or further position.

9. The method of claim 1, comprising:

before initiating the callback, checking, by the device running the bot, whether an antenna overload issue exists, and in response to a determination that no antenna overload issue exists, performing the initiating of the callback.

10. The method of claim 1, comprising:

monitoring, by the device running the bot, network capabilities of a cellular and/or wireless infrastructure to detect any antenna overload issues.

11. The method of claim 1, wherein a cellular/wireless infrastructure comprises a three-sector networking infrastructure and/or a multi-sector networking infrastructure.

12. The method of claim 1, wherein a cellular/wireless infrastructure comprises a three-sector networking infrastructure, the method comprising:

waiting, by the device running the bot, until a free slot is available, wherein another sector with free slots located more than 1 km from the abandoned device position p and an average time needed for a 1 km walking distance is more than an average time for slots available during a day.

13. The method of claim 11, wherein the cellular/wireless infrastructure comprises a three-sector networking infrastructure, the method comprising:

sending, by the device running the bot, a message to the abandoned call device to move to another sector, wherein an average time needed for a 100 meters walking distance is significantly less than a medium time for slots available during a day.

14. The method of claim 1, wherein the first message sent by the device running the bot comprises one of a Short Messages Service (SMS) messaging, a socket communication over any type of protocol, or a silent SMS.

15. The method of claim 1, comprising:

the device running the bot utilizing an internal for-loop for anticipating an overload issue depending on a cellular/wireless network infrastructure and/or statistical measurements for slots available during a day for use in initiating the callback.

16. The method of claim 1, comprising:

in response to the callback to the abandoned call device being unsuccessful:

querying whether there are other devices in an abandoned call list or in an active call list of an Emergency Service Routing Proxy (ESRP) or a Public Safety Answering Point (PSAP) which currently communicate and/or has communicated successfully from the at least first position;

in response to no other devices being found in the abandoned call list or in the active call list, extending the querying to other devices in proximity to the at least first position and, in response to other devices in proximity to the at least first position being found, instructing the other devices to go to the at least first position;

testing input from the other devices in parallel to the abandoned call of the abandoned call device and, upon a difference in stream quality being detected, determining that all devices are in the at least first position; and blacklisting malfunctioned device(s) in response to there being a difference in stream quality.

17. A system for efficient callback functionality using signal coverage data, the system comprising:

a communication device having a processor connected to a non-transitory computer readable medium having code stored thereon that defines a bot, the communication device configured to detect an abandoned call of a device which has tried to establish an emergency call or for which an emergency call was not yet completed;

query a network carrier to retrieve signal data related to the abandoned call device;

retrieve, within last k minutes, signal data from the carrier related to one or more other successful active device in a radius x, with respect to a position p of the abandoned call device, wherein a successful active device is an active device which successfully managed to establish a call and the signal data identifies physical positions n of the one or more other successful active device;

analyze the position p of the abandoned call device and sending an update request to the carrier to retrieve a latest position p of the abandoned call device;

send a first message to the abandoned call device, based on the signal data retrieved for the one or more successful active device in the radius x, to guide the abandoned call device to at least a first position;

initiate a callback to the abandoned call device when the abandoned call device reaches the first position; and connect the abandoned call device with a call taker of a call center.

* * * * *